(12) United States Patent
Skow et al.

(10) Patent No.: US 8,910,405 B1
(45) Date of Patent: Dec. 16, 2014

(54) MUNICIPAL METER TICKET DISPLAY

(71) Applicants: Ivy Skow, Forest Hills, NY (US); Peter Skow, Forest Hills, NY (US)

(72) Inventors: Ivy Skow, Forest Hills, NY (US); Peter Skow, Forest Hills, NY (US)

( * ) Notice: Subject to any disclaimer, the term of this patent is extended or adjusted under 35 U.S.C. 154(b) by 0 days.

(21) Appl. No.: 13/728,371

(22) Filed: Dec. 27, 2012

Related U.S. Application Data

(60) Provisional application No. 61/580,374, filed on Dec. 27, 2011.

(51) Int. Cl.
*G09F 21/04* (2006.01)
*G09F 3/18* (2006.01)
*B60R 7/06* (2006.01)

(52) U.S. Cl.
CPC .... *G09F 3/18* (2013.01); *B60R 7/06* (2013.01)
USPC ............................................. 40/643; 224/277

(58) Field of Classification Search
USPC ............................... 40/643, 661.07
See application file for complete search history.

(56) References Cited

U.S. PATENT DOCUMENTS

| | | | | |
|---|---|---|---|---|
| 1,050,831 A | * | 1/1913 | Hoffman | 40/661.07 |
| 3,242,959 A | * | 3/1966 | Glass | 206/37 |
| 3,533,178 A | * | 10/1970 | Strohmaier | 40/643 |
| 4,071,174 A | * | 1/1978 | Weiner | 224/277 |
| 5,038,926 A | * | 8/1991 | van der Toorn | 206/39.3 |
| 5,960,572 A | * | 10/1999 | DeVito | 40/593 |
| 6,163,997 A | * | 12/2000 | Deralas | 40/745 |
| 6,446,375 B1 | * | 9/2002 | Davis | 40/597 |
| 2009/0084009 A1 | * | 4/2009 | Vandergriff et al. | 40/546 |
| 2011/0062177 A1 | * | 3/2011 | Ray | 220/812 |
| 2012/0318686 A1 | * | 12/2012 | Koniers | 206/216 |

FOREIGN PATENT DOCUMENTS

| | | |
|---|---|---|
| CN | 2057389 U | 5/1990 |
| CN | 2057390 U | 5/1990 |
| DE | 19654698 A1 | 7/1997 |
| SE | 502065 C2 | 7/1995 |

OTHER PUBLICATIONS

Products UK, "Parking ticket holder", found at http://www.productsuk.com/Parking.htm, Dec. 21, 2012 (1 page).
MUNI Ticket Safe, "MUNI Ticket Safe", found at http://www.muniticketsafe.com/, Dec. 21, 2012 (1 page).
Oh Gizmo!, "Parking Ticket Holder for Your Windshield", found at http://www.ohgizmo.com/2007/11/22/parking-ticket-holder-for-your-windshield/, Dec. 21, 2012 (2 pages).
Amazon.com, "Windshield Muni-Meter Parking Ticket Holder Clip: Automotive", found at http://www.amazon.com/Windshield-Muni-Meter-Parking-Ticket-Holder/dp/B0096TRD . . . , Dec. 21, 2012 (3 pages).
Parknslide, "Parknslide Car Park Ticket Holder", found at http://www.parknslide.com/, Dec. 21, 2012 (2 pages).

(Continued)

*Primary Examiner* — Kristina Junge
(74) *Attorney, Agent, or Firm* — McCarter & English, LLP

(57) ABSTRACT

A device is disclosed for the safe, secure and reliable display of a municipal meter parking ticket, or similar item, from the interior of an automobile or motor vehicle. The device includes a base with a rotating lid. The rotating lid locks or engages over the municipal meter parking ticket which is on the base. Additionally, a chamber may be formed with a slot through which the municipal meter parking ticket is inserted.

2 Claims, 3 Drawing Sheets

(56) References Cited

OTHER PUBLICATIONS

Amazon.com, "Car Windscreen Parking Ticket Holder Clip", found at http://www.amazon.co.us/WINDSCREEN-PARKING-TICKET-HOLDER-CLIP/dp/B00 . . . , Dec. 21, 2012 (4 pages).
Windshield Muni-Meter Parking Ticket Holder Clip : Amazon.com : Automotive—http://www.amazon.com/Windshield-Muni-Meter-Parking-Ticket-Holder/dp/B0096TRDZG (7 pages).
Muni Meter Display Holder—http://www.shop.juliannetwork.com/Muni-Meter-Display-Holder-JN0000004.htm (2 pages).
muniticketsafe.com—http://www.muniticketsafe.com/ (2 pages).
Muni Display Parking Slip Holder—http://www.amazon.com/Muni-Display-Parking-Slip-Holder/dp/B007JWUCEQ (3 pages).
Amazon.com: Avoid Parking Tickets! Municipal Safe Display Parking Ticket Holder: Off . . . http://www.amazon.com/Parking-Tickets-Municipal-Display-Ticket/dp/B00AZO7JM8 (5 pages).

* cited by examiner

MUNICIPAL METER TICKET DISPLAY

BACKGROUND OF THE DISCLOSURE

1. Field of the Disclosure

The disclosed embodiments pertain to an apparatus for safely and reliably displaying a municipal meter ticket, typically for parking, within an automobile or other motor vehicle.

2. Description of the Prior Art

In the prior art, it is very common for a municipality or other entity to provide access to a parking facility by selling, typically through a credit card-based vending machine, tickets which are then displayed placed within an interior of the automobile or motor vehicle so as to be visible through the window thereof. This serves to indicate that the appropriate parking fee has been paid for that automobile or motor vehicle, typically for a given time period which is printed on the ticket. However, merely putting the ticket on the dashboard or other structure of the automobile or motor vehicle is problematic in that the ticket may become displaced or lost, thereby resulting in a parking violation for the automobile or motor vehicle. In addition, currently available devices lack the ability to enhance visibility of the ticket thereby further creating the problem of making the ticket unknown. Similarly, devices currently available do not have the ability to hold more than one ticket over time securely. If more than one ticket was attempted to be held by currently available ticket holders the tickets would become dislodged as the devices are currently made to hold only one ticket at a time. Users may desire to place more than one ticket in a holder and dispose of the used tickets at another time. This feature, among others is not currently available in the current ticket holders.

SUMMARY AND OBJECTS OF THE INVENTION

It is therefore an object of the present disclosure to provide an apparatus and method for securing a municipal meter parking ticket, or similar item, at a location within the passenger compartment of an automobile or motor vehicle, whereby the ticket remains visible through the car window, and is not prone to loss or other displacement.

These and other objects are attained by providing a container made of clear rigid material, such as, but not limited to, glass, plexiglass, plastic or similar material. The container holds the municipal parking ticket and is attached or secured within the interior of the vehicle thereby maintaining the location and visibility of the municipal parking ticket.

BRIEF DESCRIPTION OF THE DRAWINGS

In the drawings, wherein similar reference characters denote similar elements throughout the several views.

DETAILED DESCRIPTION OF THE PREFERRED EMBODIMENT

Figure 1:
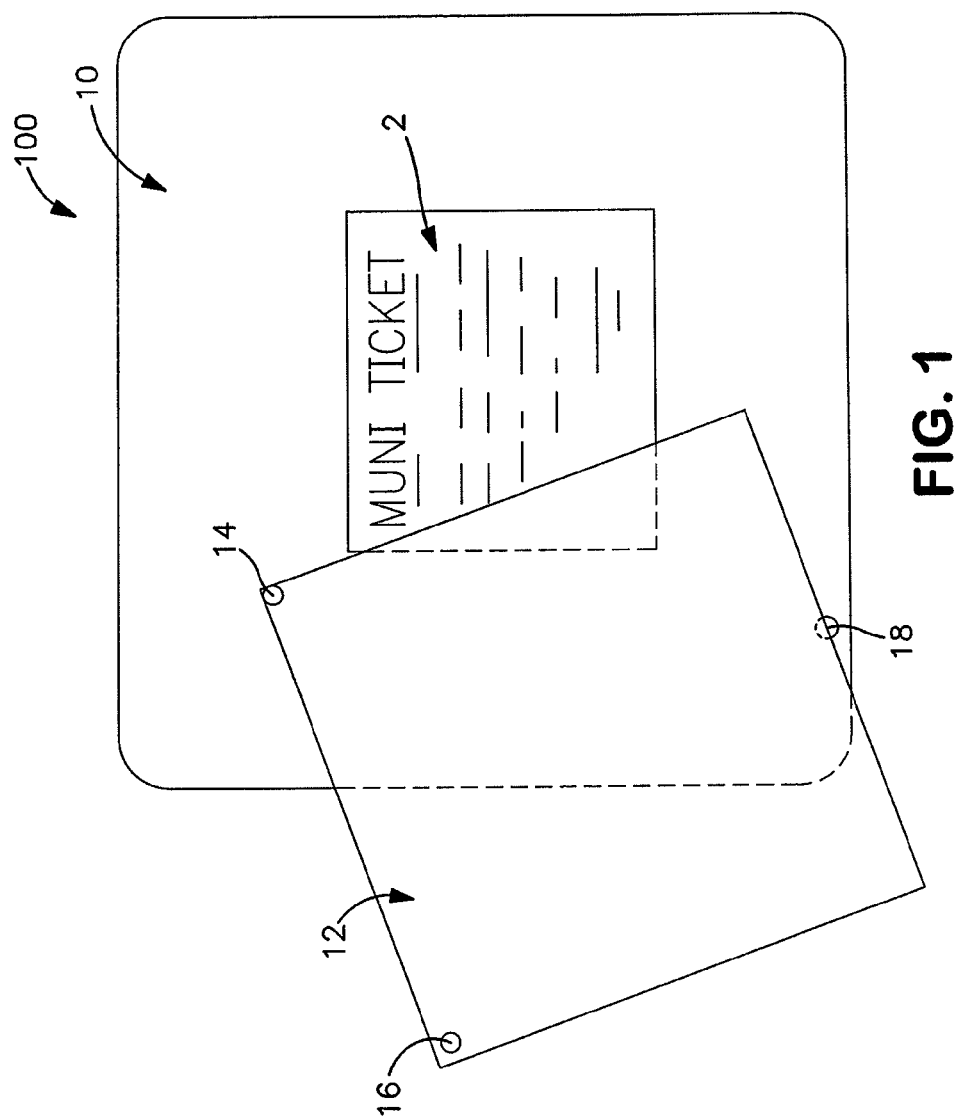
FIG. 1 is a front plan view of a typical embodiment of the present disclosure.

Referring now to the drawings in detail wherein like numerals refer to like elements throughout the several views, one sees that FIG. 1 is a front plan view of municipal meter ticket display 100. Municipal meter ticket display 100 includes base plate 10 which is typically a solid planar piece of plastic, neoprene or similar clear material. While not illustrated, the rear of base plate 10 may be configured to attach to a dashboard or similar structural element of the automobile or motor vehicle. The municipal meter ticket 2 is placed in a central area of base plate 10. While not illustrated, a central shallow well may be formed in a central area of base plate 10 in order to receive the municipal meter ticket 2. Lid 12 is rotatably affixed to base plate 10 about an axis formed by pin 14. First detent element 16, typically implemented as an aperture is likewise formed on lid 12. While FIG. 1 illustrates first detent element 16 as being on the corner of lid 12 adjacent to the corner where pin 14 is found, other positions are likewise available. Second detent element 18 is likewise formed on base plate 10. First and second detent elements 16, 18 are positioned so that they align and engage with each other when the lid 12 has been rotated to a position to cover the central area of base plate 10, thereby covering the municipal meter ticket. Second detent element 18 may be configured as an aperture, so that when the lid 12 is rotated so apertures of first and second detent elements 16,18 align, a pin (not shown) is placed through the apertures thereby engaging the lid 12 over the municipal parking ticket 2. Alternatively, second detent element 18 may be a boss or other male or extending element which is received by the aperture of first detent element 16. Other alternative to the detent may be a lever or other locking mechanism.

Figure 2:
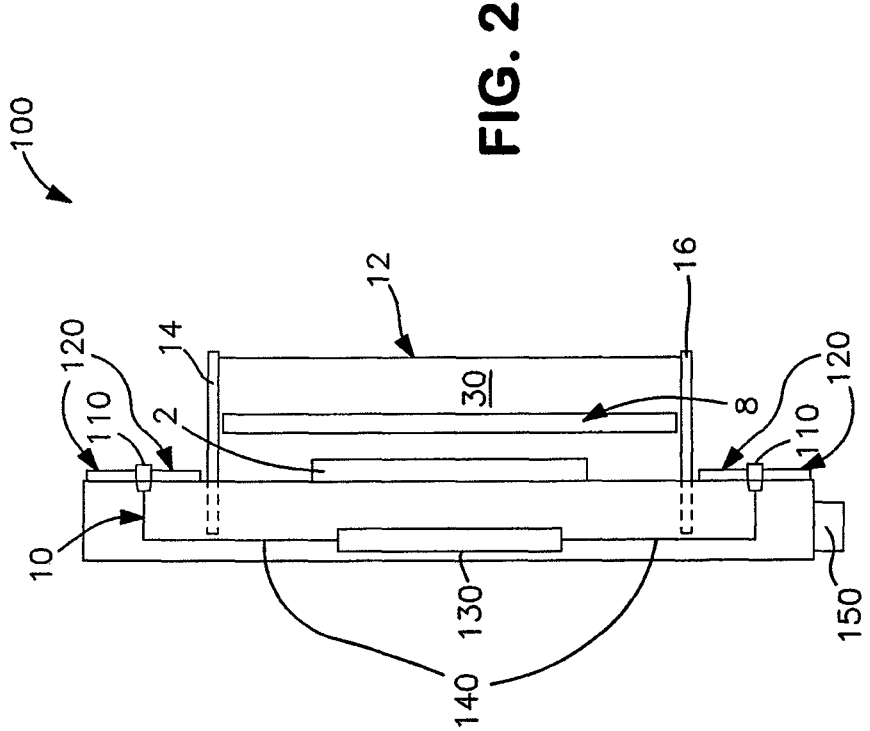
FIG. 2 is a side plan view of a further typical embodiment of the present disclosure.
Figure 3:
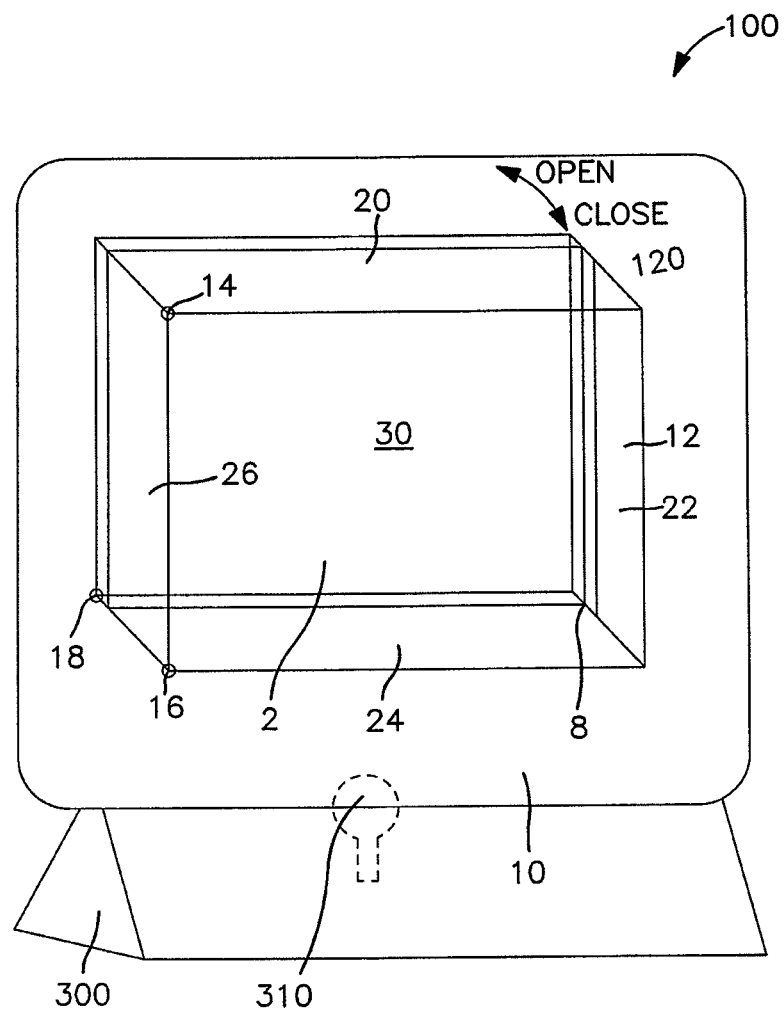
FIG. 3 is a front perspective view of the embodiment of FIG. 2.

As shown in FIGS. 2 and 3, lid 12 may be separated from planar base by walls 20, 22, 24, 26 (perpendicular to both planar base 10 and lid 12) so that chamber 30 is formed therebetween. The chamber may be formed by the lid, the base or a combination of the lid and base depending on the embodiment. The chamber allows the user to place many tickets in the display thereby avoiding the need to empty the display after each ticket use. A slot 8 may be formed in wall 22 to allow the municipal parking ticket 2 to be inserted into chamber 30 without the necessity for moving the lid 12. The slot may be formed on the side or top for ease of placement of the ticket. As shown in FIG. 2, in this embodiment, first detent element 16 is configured as a male element and second detent element 18 is configured as an aperture or female element. Optionally, a suction cup 150 may be attached to the base to allow the display to be placed on a vehicle dashboard. The suction cup may include a ball and socket joint to allow the display to be rotated in any direction for belter display.

In either embodiment, the municipal ticket meter display 100 is placed within an automobile or motor vehicle and the municipal meter ticket. Further in FIG. 2 is shown light emitting diodes (LEDs) 110. The LEDs may be connected by wires 140 to an energy source 130 such as a battery. Preferably the energy source is within the base. Alternatively, the LEDs may be powered by one or more solar cells 120. The solar cells are disposed on the base to obtain light rays. The base may be blackened or reflective to increase the solar emissions. In addition a reflective backing on the base may be used to increase visibility of the ticket inside the display device. For further increased visibility the lid 12 may be tinted to alert ticket purchase. The tint of lid 12 may be a florescent or bright color such a florescent orange or yellow to increase visibility of the display and ticket.

Another embodiment for the base is for the base to have a backing made of glow in the dark material. An example of such a backing is a solar activated glow in the dark backing. The backing may be comprised od copper doped zinc sulfide or glow powder that is activated by the solar rays and glows in the dark. Such backing would allow the display to be seen at night with no need to replace batteries.

FIG. 3 is a three dimensional view that shows that the display securely holds the entire ticket. A stand 300 may be used with the display. Stand 300 may be attached to the base by a swivel 310. Depending on the embodiment, swivel 310 may be a ball and socket joint to allow the display to move forward and backward relative to the stand. In addition the ball and socket joint would allow movement clockwise and counter clockwise to increase visibility of the display. The display and the stand may have a means fro securing it to the dashboard. Depending on the implementation, an adhesive strip may be applied to the stand or in the absence of the stand to the bottom of the base. The adhesive strip may include Velcro or loop and hoop mechanisms to allow removal of the display form the dashboard. Alternatively, the stand may incorporate a suction cup device to allow the stand to be place on the dashboard and removed when desired.

Other alternative embodiments or implementations according to the various teachings of the present invention will be understood by those skilled in the art and are achieved without departing from the spirit and scope of the invention. In accordance with the scope of the invention, access to the networking site or other sites may include exclusive access to the site or sender's information, or combination of both access to the site and sender's information. It is therefore intended that the present invention is not limited to the disclosed embodiments described herein but should be defined in accordance with the claims that follow.

What is claimed is:

1. A display device for a municipal meter parking ticket, including:
   a base having a bottom surface in a first plane and comprising a suction cup for securing the display device to an interior of a motor vehicle, the suction cup including a ball and socket joint to allow the display device to be rotated, the base made of clear material; the base including a male detent element;
   a lid having a top surface in a second plane parallel to the first plane, the lid including a female detent element located on a corner of the lid, the lid having a florescent tint;
   a chamber formed by the base, the lid, an upper wall, a lower wall, a left wall, and a right wall, the upper wall, the lower wall, the left wall and the right wall each having surfaces in planes perpendicular to both the first plane and the second plane;
   a pin attached to the base and lid and having a length extending along a line perpendicular to both the first plane and the second plane,
   the lid rotatable within the second plane and about the pin to a final position so that a first municipal meter parking ticket having a front and back is entirely secured, front and back, within the chamber and engaged between the base, the lid, the upper wall, the lower wall, the left wall, and the right wall, wherein, when the lid is in the final position, the male detent element and the female detent element align with one another to engage the lid and prevent the lid from opening;
   light emitting diodes (LED) disposed around the base for enhancing visibility of the first municipal meter parking ticket and one or more solar cells disposed on the base for powering the LEDs;
   a reflective backing on the base to increase visibility of the first municipal meter parking ticket; and
   a slot provided in the upper wall, the left wall, or the right wall for allowing insertion therethrough of a second municipal meter parking ticket into the chamber while the lid is in the final position and while the first municipal meter parking ticket is secured, front and back, within the chamber.

2. A display device for a municipal meter parking ticket, including:
   a base having a bottom surface in a first plane and comprising a stand for securing the display device to a dashboard of a motor vehicle, the stand including a loop and hoop mechanism to removably attach the stand to the dashboard of the motor vehicle, the stand including a ball and socket joint to allow the display device to move forward and backward relative to the stand, the base made of clear material and having one of a reflective backing or a backing with solar activated glow in the dark material for increased visibility; the base including a first aperture;
   a lid having a top surface in a second plane parallel to the first plane, the lid including a second aperture located on a corner of the lid, the lid having a florescent tint;
   a chamber defined by the lid, the base, an upper wall, a lower wall, a left wall, and a right wall, the upper wall, the lower wall, the left wall and the right wall each having surfaces in planes perpendicular to both the first plane and the second plane;
   a pin attached to the base and lid and having a length extending along a line perpendicular to both the first plane and the second plane,
   the lid rotatable within the second plane about the pin to a final position so that a first municipal meter parking ticket having a front and back is entirely secured, front and back, and engaged between the base, the lid, the upper wall, the lower wall, the left wall, and the right wall, and within the chamber, wherein, when the lid is in the final position, the first aperture and the second aperture align with one another such that a second pin can be placed through the first aperture and the second aperture to engage the lid and prevent the lid from opening;
   light emitting diodes (LED) disposed around the base for enhancing visibility of the first municipal meter parking ticket and one or more solar cells disposed on the base for powering the LEDs;
   a reflective backing on the base to increase visibility of the first municipal meter parking ticket; and
   a slot provided in the upper wall, the left wall, or the right wall for allowing insertion therethrough of a second municipal meter parking ticket into the chamber while the lid is in the final position and while the first municipal meter parking ticket is secured, front and back, within the chamber.

* * * * *